(12) United States Patent
Hillshafer et al.

(10) Patent No.: US 11,898,096 B2
(45) Date of Patent: Feb. 13, 2024

(54) POLYESTER DIVERTING AGENTS FOR LOW-TEMPERATURE OIL WELLS

(71) Applicant: STEPAN COMPANY, Northfield, IL (US)

(72) Inventors: Douglas Kip Hillshafer, Western Springs, IL (US); Sarah Wolek, Arlington Heights, IL (US)

(73) Assignee: Stepan Company, Northfield, IL (US)

( * ) Notice: Subject to any disclaimer, the term of this patent is extended or adjusted under 35 U.S.C. 154(b) by 57 days.

(21) Appl. No.: 17/617,729

(22) PCT Filed: Jun. 15, 2020

(86) PCT No.: PCT/US2020/037782
§ 371 (c)(1),
(2) Date: Dec. 9, 2021

(87) PCT Pub. No.: WO2020/257112
PCT Pub. Date: Dec. 24, 2020

(65) Prior Publication Data
US 2022/0251441 A1 Aug. 11, 2022

Related U.S. Application Data

(60) Provisional application No. 62/863,404, filed on Jun. 19, 2019.

(51) Int. Cl.
*C09K 8/68* (2006.01)
*C09K 8/72* (2006.01)
*C09K 8/88* (2006.01)

(52) U.S. Cl.
CPC .............. *C09K 8/725* (2013.01); *C09K 8/68* (2013.01); *C09K 8/885* (2013.01); *C09K 2208/18* (2013.01)

(58) Field of Classification Search
None
See application file for complete search history.

(56) References Cited

U.S. PATENT DOCUMENTS

| 6,547,094 | B1* | 4/2003 | Jacobs | B65D 35/44 |
| | | | | 264/328.18 |
| 7,475,728 | B2 | 1/2009 | Pauls | |
| 8,109,335 | B2 | 2/2012 | Luo | |
| 9,090,810 | B2 | 7/2015 | Bour | |
| 9,580,642 | B2 | 2/2017 | Brannon | |
| 9,657,557 | B2 | 5/2017 | Bugrin | |
| 9,879,503 | B2 | 1/2018 | Nguyen | |
| 2008/0200352 | A1 | 8/2008 | Willberg | |
| 2014/0377555 | A1* | 12/2014 | Saigusa | D01F 8/14 |
| | | | | 428/374 |
| 2016/0201442 | A1 | 7/2016 | Gullickson | |
| 2017/0342206 | A1* | 11/2017 | Yoshikawa | C08G 63/12 |
| 2018/0010037 | A1* | 1/2018 | Yoshikawa | E21B 43/267 |

FOREIGN PATENT DOCUMENTS

| WO | 2006090116 | 8/2006 |
| WO | 2010094932 | 8/2010 |
| WO | 2014099616 | 6/2014 |
| WO | 2017106077 | 6/2017 |

OTHER PUBLICATIONS

International Search Report issued in International Application No. PCT/US2020/037782 dated Oct. 7, 2020; 4 pages.

* cited by examiner

*Primary Examiner* — Andrew Sue-Ako
(74) *Attorney, Agent, or Firm* — DILWORTH IP, LLC

(57) ABSTRACT

A hydraulic fracturing method for recovering oil from a low-temperature subterranean oil formation is disclosed. Before, during, or after inducing hydraulic fracturing within the formation, a particulate, degradable polyester diverting agent is introduced into the formation in an amount effective to improve oil production from the formation. The diverting agent is allowed to degrade, and oil is recovered. The diverting agent has a melting point greater than the average temperature of the formation and is selected from: (i) ethylene glycol succinates; (ii) acid-terminated ethylene glycol succinates; (iii) acid-terminated polyglycolic acids; (iv) acid-terminated polylactic acids; (v) mixtures of any of (i) through (iv) with a half acid ester; and (vi) mixtures of polylactic acids or polyglycolic acids with a half acid ester. These easily synthesized classes of particulate polyester diverting agents degrade more effectively than polylactides under the conditions present in low-temperature wells and should help to enhance well productivity.

8 Claims, No Drawings

POLYESTER DIVERTING AGENTS FOR LOW-TEMPERATURE OIL WELLS

FIELD OF THE INVENTION

The invention relates to polyester compositions and their use in hydraulic fracturing as diverting agents, particularly for low-temperature oil wells.

BACKGROUND OF THE INVENTION

Hydraulic fracturing is an oil-and-gas well stimulation technique that uses pressurized liquid to fracture rock to allow trapped oil reserves to flow and be recovered. Diverting agents are used during hydraulic fracturing to temporarily plug existing fractures to allow for additional pressurization and fracturing. The diverting agent must then leave the fractures, typically by decomposing or dissolving, to optimize oil extraction. The speed at which a diverting agent can degrade or be removed matters. The U.S. Department of Energy reports that the cost to operate an oil well can range from $250,000 to $450,000 per day irrespective of well output because most of the cost relates to equipment and labor. Thus, any product that can speed oil extraction will increase the profitability of the well.

Various compositions—from rock salt, oyster shells, and moth balls to many kinds of degradable natural or synthetic polymers—have been proposed as diverting agents.

Polylactic acid ("PLA"), a solid, degradable polymer made principally by ring-opening polymerization of cyclic lactides, is commonly used as a diverting agent and may be the most commonly used diverting agent in the Permian Basin of southwestern Texas. The lower bottom hole temperature wells of this fast-growing oil-and-gas exploration region range from 90° F. to 150° F., so diverting agents that can degrade rapidly at relatively low temperature are needed. PLA does not degrade rapidly at temperatures below about 130° F. To overcome this problem, oil-and-gas professionals have resorted to mineral acids or other "degradation enhancers" that can help to accelerate decomposition of the diverting agent. Unfortunately, the acids or other degradation enhancers can permanently damage well formations, so their usefulness is limited.

U.S. Pat. No. 9,580,642 describes "dissolvable diverters" that include phthalic anhydride, terephthalic acid, gilsonite, rock salt, benzoic acid flakes, and polymeric mixtures, among other diverters. Polylactides, especially those having weight-average molecular weights from 100,000 to 200,000 g/mol are taught as preferred aliphatic polyesters. In the examples, the reference teaches that PLA alone is suitable for use as a diverting agent at temperatures greater than 250° F., but combining it with a mixture of phthalic anhydride and phthalic acid can reduce the temperature at which PLA can dissolve to 180° F.

WO 2017/106,077 suggests using many of the same diverters taught in the '642 patent but in combination with a degradation enhancer, typically a basic compound such as an alkali metal hydroxide, an alkaline earth metal carbonate, or an amine.

U.S. Pat. No. 9,879,503 describes other self-degradable diverting agents, including polyethylene glycol, citrate esters, glucose monoesters, partial fatty esters, PEG monolaurates, and triacetin, among others. U.S. Pat. No. 8,109,335 recommends using a degradable fatty alcohol as one component of a diverting agent. U.S. Pat. No. 7,475,728 teaches to use an orthoester, poly(orthoester), or a combination thereof as a degradable diverting agent. No results are reported in these patents.

U.S. Pat. No. 9,657,557 teaches the use of polysaccharides in combination with polyester fibers, including PLA fibers, as diverting agents.

U.S. Pat. No. 9,090,810 describes various synthetic polymers suitable for use as high-temperature diverters. Listed examples include polyethylene terephthalate (PET), polybutylene succinate (PBS), polycaprolactone (PCL), polypropylene fumarate (PPF), and polyhydroxyalkanoates (PHA).

The industry would benefit from the availability of diverting agents having the ability to quickly degrade at low temperature, particularly the low temperatures characteristic of the lower bottom hole temperature wells of the Permian Basin. Of interest are diverting agents that are commercially available or can be easily synthesized by known methods from inexpensive raw materials. Ideally, the diverting agents would be particulate solids at the well temperature and would degrade more effectively than PLA without the need for a degradation enhancer at temperatures well below 150° F., or even below 130° F., to enhance the productivity of the well.

SUMMARY OF THE INVENTION

In one aspect, the invention relates to a hydraulic fracturing method for recovering oil from a low-temperature subterranean oil formation. The method comprises: (a) before, during, or after inducing hydraulic fracturing within the formation, introducing into the formation a particulate, degradable polyester diverting agent in an amount effective to improve oil production from the formation; (b) allowing the diverting agent to degrade; and (c) recovering oil from the formation. The diverting agent has a melting point greater than the average temperature within the formation. The diverting agent is selected from: (i) ethylene glycol succinates; (ii) acid-terminated ethylene glycol succinates; (iii) acid-terminated polyglycolic acids; (iv) acid-terminated polylactic acids; (v) mixtures of any of (i) through (iv) with a half acid ester; and (vi) mixtures of polylactic acids or polyglycolic acids with a half acid ester.

We surprisingly found that certain classes of particulate polyester compositions degrade more effectively under conditions present in low-temperature wells, such as those found in the Permian Basin, than polylactic acid or other commonly used diverting agents. We also found that degradation times can be reduced by terminating polyester diverting agents with carboxylic acid groups or by combining them with a minor proportion of a half acid ester. The diverting agents are readily available or are easily synthesized and should help to enhance the productivity of low-temperature wells.

DETAILED DESCRIPTION OF THE INVENTION

In one aspect, the invention relates to a hydraulic fracturing method for recovering oil from a low-temperature subterranean oil formation.

By "low-temperature" subterranean oil formation, we mean a formation having an average temperature less than 180° F., typically within the range of 80° F. to 150° F., more typically from 110° F. to 130° F.

"Hydraulic fracturing" refers to a well-stimulation method in which a fracturing fluid, typically water containing sand or other granular proppants, is injected under high pressure into a wellbore to create cracks in the formation that allow natural gas, oil, and brine to flow more freely. Proppants help to keep the fractures open after hydraulic pressure is removed from the well.

"Diverting agent" refers herein to particulate materials that can temporarily block or plug existing fractures and allow for additional pressurization and fracturing. The diverting agent degrades, ideally within a week or two, thereby allowing petroleum products and/or brines to flow and be recovered. The diverting agent is introduced into the formation before, during, or after inducing hydraulic fracturing within the formation.

The diverting agent is used in an amount effective to improve oil production from the formation.

Thus, in one aspect, the invention relates to a hydraulic fracturing method for recovering oil from a low-temperature subterranean oil formation. The method comprises: (a) before, during, or after inducing hydraulic fracturing within the formation, introducing into the formation a particulate, degradable polyester diverting agent in an amount effective to improve oil production from the formation; (b) allowing the diverting agent to degrade; and (c) recovering oil from the formation.

Diverting Agents

Suitable diverting agents are selected from (i) ethylene glycol succinates; (ii) acid-terminated ethylene glycol succinates; (iii) acid-terminated polyglycolic acids; (iv) acid-terminated polylactic acids; (v) mixtures of any of (i) through (iv) with a half acid ester; and (vi) mixtures of polylactic acids or polyglycolic acids with a half acid ester.

1. Ethylene Glycol Succinates

In some aspects, the diverting agent is an ethylene glycol succinate, i.e., a polyester comprising recurring units of ethylene glycol and succinic acid (or succinic anhydride). Suitable ethylene glycol succinates can be made by condensation polymerization. In some aspects, the ethylene glycol succinates have primarily (or even exclusively) hydroxyl end groups. Such ethylene glycol succinates will have hydroxyl values within the range of 14 to 400 mg KOH/g, or from 28 to 225 mg KOH/g, or from 40 mg to 112 mg KOH/g. In some aspects, the ethylene glycol succinates will have number-average molecular weights within the range of 500 to 10,000 g/mol, or from 1,000 to 4,000 g/mol. In some aspects, the ethylene glycol succinate will have residual acidity from carboxylic acid end groups. Thus, in some aspects, the ethylene glycol succinates will have acid values within the range of 1 to 100 mg KOH/g, from 10 to 70 mg KOH/g, or from 20 to 50 mg KOH/g. For examples, see below at Table 1, Examples 1, 3, and 5, 6, and 8.

2. Acid-Terminated Ethylene Glycol Succinates

In some aspects, the diverting agent is an acid-terminated ethylene glycol succinate. By "acid-terminated," we mean a reaction product of an ethylene glycol succinate with a cyclic anhydride or a dicarboxylic acid, preferably a cyclic anhydride, that generates a carboxylic acid end group from a hydroxyl end group. The ethylene glycol succinate is reacted with enough of the dicarboxylic acid or cyclic anhydride to acid-terminate some or all of the available hydroxyl groups. Suitable cyclic anhydrides or dicarboxylic acids are aliphatic (e.g., succinic anhydride, succinic acid, maleic anhydride, itaconic anhydride, maleic acid, fumaric acid) or aromatic (e.g., phthalic anhydride, trimellitic anhydride, pyromellitic dianhydride, isophthalic acid, terephthalic acid). Aromatic cyclic anhydrides are preferred.

In some aspects, an acid-terminated product is conveniently formed by combining a freshly made ethylene glycol succinate while still warm with a desired proportion of a cyclic anhydride, preferably an aromatic cyclic anhydride. The cyclic anhydride ring readily opens to give the expected half acid ester product. We found that the resulting acidity from phthalic acid residues from terminating ethylene glycol succinates with phthalic anhydride can further promote degradation of the diverting agent (see Table 1, Examples 2 and 4, below).

The amount of cyclic anhydride (or dicarboxylic acid) used to acid-terminate the ethylene glycol succinate varies and depends the desired acidity, degradability, solubility, melting range, the nature of the formation, well temperature, and other factors. Generally, however, the amount used will range from 0.1 to 20 wt. %, or from 1 to 15 wt. %, or from 5 to 10 wt. %, based on the combined amounts of ethylene glycol succinate and cyclic anhydride or dicarboxylic acid used.

3. Acid-Terminated Polyglycolic Acids

In some aspects, the diverting agent is an acid-terminated polyglycolic acid. By "acid-terminated," we mean a reaction product of a polyglycolic acid with a cyclic anhydride or a dicarboxylic acid, preferably a cyclic anhydride, that generates a carboxylic acid end group from a hydroxyl end group. Suitable cyclic anhydrides or dicarboxylic acids are described in Section 2.

Polyglycolic acid ("PGA" or "polyglycolide") is known as a degradable diverting agent. Although some literature suggests that PGA having relatively high weight-average molecular weight (100,000 to 200,000 g/mol) and produced by ring-opening polymerization should be used, at least one product having a molecular weight of about 600 g/mol was commercially available from DuPont in 2010 (Polyglycolic acid TLF 6267). The high-molecular-weight product, which is used for dissolvable sutures, is expensive. However, desirable PGA of low number-average molecular weight are conveniently made by dehydrating 70% aqueous mixtures of glycolic acid, which are inexpensive and readily available. We found that the low-molecular-weight PGA (desirably, number-average molecular weights of 400 to 5,000 g/mol or 500 to 2,000 g/mol) degrades readily at temperatures below 150° F., and even at 110-120° F. However, the degradation rate can be further increased by reacting the PGA with a minor proportion of a cyclic anhydride (e.g., phthalic anhydride) or a dicarboxylic acid is used to acid-terminate some or all of the hydroxyl end groups (see Table 1, Examples 10 and 12 and Comparative Examples 9 and 11, below).

The amount of cyclic anhydride (or dicarboxylic acid) used to acid-terminate the PGA varies and depends the desired acidity, degradability, solubility, melting range, the nature of the formation, well temperature, and other factors. Generally, however, the amount used will range from 0.1 to 20 wt. %, or from 1 to 15 wt. %, or from 5 to 10 wt. %, based on the combined amounts of PGA and cyclic anhydride or dicarboxylic acid used.

4. Acid-Terminated Polylactic Acids

In some aspects, the diverting agent is an acid-terminated polylactic acid. By "acid-terminated," we mean a reaction product of a polylactic acid with a cyclic anhydride or a dicarboxylic acid, preferably a cyclic anhydride, that generates a carboxylic acid end group from a hydroxyl end group. Suitable cyclic anhydrides or dicarboxylic acids are described in Section 2.

Polylactic acids ("PLA" or "polylactides") are well-known diverting agents and are commercially available (e.g., BIOVERT® NWB polylactide from Halliburton). Although polylactic acids degrade effectively at higher temperatures (e.g., 150° F.), we found that they degrade much less effectively at 120° F., a temperature that is common in many wells in the Permian Basin of southwestern Texas. As noted above, we found that acid termination of PGA with a cyclic anhydride or dicarboxylic acid improves the degradability of the PGA, and we expect that degradability of the structurally similar PLA materials to improve with acid termination.

The amount of cyclic anhydride or dicarboxylic acid used to acid-terminate the PLA varies and depends the desired acidity, degradability, solubility, melting range, the nature of the formation, well temperature, and other factors. Generally, however, the amount used will range from 0.1 to 20 wt. %, or from 1 to 15 wt. %, or from 5 to 10 wt. %, based on the combined amounts of PLA and cyclic anhydride or dicarboxylic acid used.

5. Mixtures Containing a Half Acid Ester in Some Aspects, the Diverting Agent, which can be any of the Materials Described in the preceding sections 1-4, is combined with a minor proportion of a half acid ester (herein also described as "HAE"). The combination provides a further improvement in degradability.

As used in this application, "half acid ester" refers to a reaction product of an alcohol or a polyol with a cyclic anhydride or a dicarboxylic acid. The reaction is performed under conditions effective to minimize or avoid oligomerization or condensation polymerization and to produce principally a 1:1 adduct of the alcohol or polyol and the cyclic anhydride or dicarboxylic acid. Reaction temperatures are typically less than 140° C., less than 130° C., or less than 120° C. The resulting half acid ester product has at least one, preferably one, free carboxylic acid group. An example is the half acid ester made by reacting phthalic anhydride with diethylene glycol at temperatures below about 120° C.:

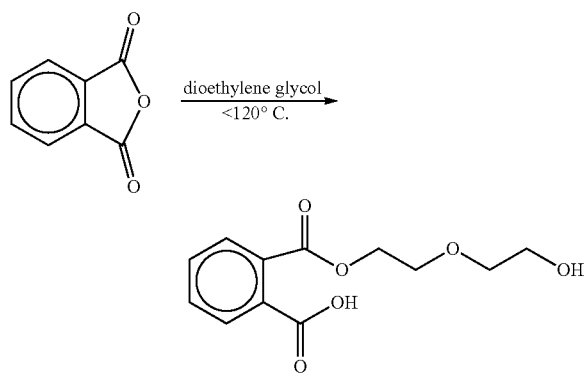

In some aspects, the HAE is made by reacting an alcohol or a polyol, usually an aliphatic diol, with an equimolar amount of a cyclic anhydride or a dicarboxylic acid, preferably a cyclic anhydride. Suitable alcohols or polyols have one or more free hydroxyl groups, and include, for example, methanol, ethanol, butanols, 2-ethylhexanols, cyclohexanol, benzyl alcohol, ethylene glycol, propylene glycol, diethylene glycol, dipropylene glycol, triethylene glycol, tripropylene glycol, 1,3-propanediol, 2-methyl-1,3-propanediol, 1,2-butylene glycol, 1,3-butylene glycol, 1,4-butanediol, neopentyl glycol, 1,6-hexanediol, cyclohexanediols, glycerol, trimethylolpropane, trimethylolethane, and the like, and mixtures thereof. In some aspects, the alcohol or polyol is an alkylene glycol, e.g., ethylene glycol, propylene glycol, diethylene glycol, or the like. Diethylene glycol is a preferred alkylene glycol.

The cyclic anhydride or dicarboxylic acid and the alcohol or polyol can be combined and reacted under any suitable conditions effective to form the half acid ester. Usually, mild heating is enough to form the desired 1:1 molar reaction product and minimize further esterification from condensation.

The amount of HAE combined with the diverting agent varies and depends the desired acidity, degradability, solubility, melting range, the nature of the formation, well temperature, and other factors. Generally, however, the amount of HAE used will range from 0.1 to 20 wt. %, or from 1 to 15 wt. %, or from 5 to 10 wt. %, based on the combined amounts of HAE and diverting agent used.

We found, for instance, that the degradability of an ethylene glycol succinate could be improved significantly by combining it with 5 wt. % of an HAE made from diethylene glycol and phthalic anhydride (in Table 1, compare Example 7 with Example 6).

6. Mixtures of PLA or PGA with a Half Acid Ester

Similarly, the HAEs described above can be used in combination with PLA, PGA, or mixtures thereof to effect an improvement in degradability of the PLA or PGA diverting agent.

The amount of HAE combined with the PLA or PGA diverting agent varies and depends the desired acidity, degradability, solubility, melting range, the nature of the formation, well temperature, and other factors. Generally, however, the amount of HAE used will range from 0.1 to 20 wt. %, or from 1 to 15 wt. %, or from 5 to 10 wt. %, based on the combined amounts of HAE and PGA or PLA (or mixture thereof) diverting agent used.

We found, for instance, that the degradability of an PGA diverting agent could be improved significantly by combining it with 5 wt. % of an HAE made from diethylene glycol and phthalic anhydride (see Table 1, Example 13 and Comparative Example 11).

The diverting agents used herein are particulate materials that have melting points greater than the average temperature of the formation such that the diverting agent can be introduced into the formation without a significant degree of melting. In some aspects, the diverting agents have melting points above room temperature, i.e., greater than 70° F., and usually greater than 100° F. Ideally, the diverting agent can be pulverized or ground, then sieved to a desired particle size range. In some cases, it may be desirable to combine particles having very different particle size distributions.

Diverting agents can be introduced into the formation by any desired means, including, for example, injection "as is" as solid particles, injection as a mixture of a gas (e.g., air or nitrogen) and solid particles, injection as a suspension or emulsion of particles in water, a brine, or a hydrocarbon, injection as a foam or foamable mixture that contains the solid particles, injection as a solid mixture with sand or another proppant or other additive, or the like. Most conveniently, the diverting agent is introduced into the formation as a dilute aqueous suspension that may also include a proppant.

The amount of diverting agent used will be an amount effective to improve oil production from the formation. The exact amount required will depend on many factors, including the well location, well temperature, age and degree of development of the well, nature of the formation, the particular diverting agent used, and other factors, and is left to the skilled person's discretion. In general, diverting agents are dosed to a well in an amount within the range of 1 ppm to 30 wt. %, or from 100 ppm to 10 wt. %, or from 1,000 ppm to 1 wt. %, based on the amount of charged mixture that contains the diverting agent.

The diverting agent is allowed to remain in contact with the formation long enough for the diverting agent to degrade. The time needed for significant and helpful degradation to occur depends on the nature of the formation, well temperature, salinity, acidity of the formation, whether an acid/base degradation enhancer is used, the nature and amount of the diverting agent, productivity requirements, and other factors. Generally, significant degradation of the diverting agent occurs within 14 days, preferably within 7 days, within 3 days, or in some cases, within 24 hours. In some aspects, the diverting agent can degrade within the formation at temperatures less than 150° F. to lose at least 10%, 20%, 30%, or 50% of its mass within 14 days. In other aspects, the diverting agent can degrade within the formation at temperatures less than 130° F. to lose at least 10%, 20%, 30%, or 50% of its mass within 14 days.

Oil is recovered from the formation by conventional means. Degradation of the diverting agent allows oil liberated by fracturing to flow through passages that were blocked temporarily or in part by particles of diverting agent and/or proppants. As the diverting agent degrades, the passages become more open and oil can flow to a production well or other oil recovery zone.

In principle, the diverting agents described herein can be used in wells characterized by relatively low or relatively high temperatures. An advantage of these diverting agents is their ability to degrade effectively at even low temperatures. In some aspects, the formation will have an average temperature less than 180° F., or within the range of 90° F. to 150° F., or from 100° F. to 130° F.

The following examples merely illustrate the invention; the skilled person will recognize many variations that are within the spirit of the invention and scope of the claims.

Commercial Materials:

The hydroxyl values and acid values indicated below are typical values.

BIOVERT® polylactide (Halliburton): lactic acid homopolymer diverting agent.

STEPANPOL® PC-101P-56 (Stepan): aliphatic polyester polyol from ethylene glycol and adipic acid. OH value: 56 mg KOH/g.

STEPANPOL® PC-102-56 (Stepan): aliphatic polyester polyol from 1,4-butanediol and adipic acid. OH value: 56 mg KOH/g.

RUCOTE® XP 5500 (Stepan): acid-functional polyester. Acid value: 75 mg KOH/g; OH value: <5 mg KOH/g.

RUCOTE® 562 (Stepan): acid-functional polyester. Acid value: 55 mg KOH/g; OH value: 8 mg KOH/g.

RUCOTE® 9006 (Stepan): acid-functional polyester. Acid value: 36 mg KOH/g; OH value: 4 mg KOH/g.

Cheesecloth Test

Hydrolysis or decomposition of candidate materials is evaluated as follows. A 3"×3" square of triple-layered, retail-grade cheesecloth (and cheesecloth strip used as a tie) are cut and weighed. Polymer test sample (about 5 g) is added to the center of the cheesecloth, and the ends are brought together and tied with the strip to enclose the sample. The cheesecloth is added to a heavy-gauge PYREX® pressure test tube with a TEFLON® seal along with deionized water (100 mL). Sealed tubes are placed in separate ovens maintained at 110° F., 120° F. and 150° F. The cheesecloth assemblies are removed from the tubes after 4, 7 and 14 days, patted dry, and further dried to constant weight in a 90° C. forced-air oven. Dry assembly weights are then recorded to allow calculation of weight percent loss for each sample.

Polyglycolic Acid (Comparative Product)

Aqueous glycolic acid (331 g of 70 wt. % solution) is added to a reaction flask equipped with a nitrogen sparge, agitator, thermocouple, temperature controller, heating mantle, and condenser. The mixture is heated to 130° C. to allow the water initially supplied with the glycolic acid to evaporate. Additional glycolic acid solution (102 g) is thereafter introduced dropwise. Once the water removal slows, the reactor contents are heated to 220° C. Titanium(IV) butoxide (one drop, about 20 mg) is added, and the mixture is allowed to react for 4-6 hours with a nitrogen sweep at 220° C. The reaction product has a melting point (by differential scanning calorimetry at 10° C./min) of 191° C. The hot liquid polyglycolic acid ("PGA") product is transferred to a suitable container and cools to room temperature. Samples are ground with mortar and pestle for the cheesecloth test. Samples taken from the reactor at different reaction times are labeled "PGA(1)" and "PGA(2)" (see Table A and Table 1).

Polyglycolic Acid with Phthalic Anhydride Cap (Inventive Product)

The apparatus described above is charged with aqueous glycolic acid (488 g of 70% solution). The mixture is heated to 130° C. to allow the water initially supplied with the glycolic acid to evaporate, and the reaction temperature is increased to 190° C. Additional glycolic acid solution (173 g) is thereafter introduced dropwise. Once the water removal slows, the reactor contents are heated to 220° C. Titanium (IV) butoxide (one drop, about 20 mg) is added, and the mixture is allowed to react for 4-6 hours with a nitrogen sweep at 220° C. A 20-g sample of the final product is removed as a control. Next, phthalic anhydride (158 g) is added to the remaining hot liquid polyglycolic acid (300 g), and the mixture reacts for 10 min. Product samples are cooled and ground with mortar and pestle for the cheesecloth test.

Ethylene Glycol Succinate with High Acid Values

The above-described apparatus is modified to include a 10" stainless-steel packed column between the reactor and the condenser. Succinic acid (273.5 g) and ethylene glycol (156.5 g) are added to the reactor. The contents are agitated under a nitrogen sparge and heated to 220° C. to remove water formed in the condensation reaction. When water removal is complete, titanium(IV) butoxide (0.04 g, 93 ppm) is added. Ten-mL samples are collected at various reaction stages; the samples have acid values of 52, 38, 32 and 21 mg KOH/g.

Ethylene Glycol Succinate Terminated with Phthalic Anhydride

The apparatus described immediately above is charged with succinic acid (580 g) and ethylene glycol (319 g). Titanium(IV) butoxide catalyst is added as before. When the product acid value reaches 1 mg KOH/g, a sample of the product (70.6 g) is removed and retained as a control; this sample has a hydroxyl value of 20 mg KOH/g. Another sample (70.7 g) is removed and combined with phthalic anhydride (3.7 g) to form the corresponding half acid ester. Ethylene glycol (9.4 g) is added to the remaining reactor material to raise the hydroxyl value to 46 mg KOH/g, and a sample (70.3 g) of this product is removed. To this sample, phthalic anhydride (8.5 g) is added to make a half acid ester. All four samples are then tested using the cheesecloth test at 120° F. The 46 hydroxyl value samples, both with and without phthalic anhydride modification, are also tested at 110° F. and 150° F.

Half Acid Ester from Phthalic Anhydride and Diethylene Glycol

A 1:1 molar reaction product of phthalic anhydride and diethylene glycol (CAS 2202-98-4, 2-(2-hydroxyethoxy) ethyl hydrogen phthalate, hereinafter simply "half acid ester" or "HAE") is prepared by briefly mixing phthalic anhydride (148 g) with diethylene glycol (106 g) at about 250° F. (120° C.) in a beaker until a clear solution is obtained. The HAE is blended as needed with hot polyester polyols.

Melting Point Determination

Product thermal transitions (melting points) of various products are characterized by a TA Instruments Discovery differential scanning calorimeter (DSC) with Trios analysis software by heating from 25° C. to 200° C. at 10° C./min.

Acid values: ASTM D4662-15
Hydroxyl values: ASTM E-222-17

The hydroxyl values and number-average molecular weights for the PGA samples (Examples C9-13) are determined by $^1$H NMR spectroscopy in pyridine-$d_5$.

Results:

Table A lists physical properties of the polyester materials prepared or tested. Table 1 summarizes results of the cheesecloth test used to evaluate polyol decomposition (i.e., mass loss) as a function of time at a particular temperature.

BIOVERT® polylactide, a commercial diverting agent, decomposes rapidly at 150° F., but its ability to decompose at 120° F. is unsatisfactory (less than 2% after 7 days) as shown in Comparative Example 14. Consequently, the polylactide would be less suitable for use in a low-temperature formation such as those found in the Permian Basin in southwestern Texas.

Other commercially available polyester polyols were also found to give poor decomposition rates in the cheesecloth test. For instance, several RUCOTE® polyesters (acid-terminated polyesters) failed to decompose significantly after 4 days at 150° C. (Comparative Examples 15-17), and two adipate polyester polyols, STEPANPOL® PC-101P-56 and STEPANPOL® PC-102-56, failed to decompose significantly after 4 days at 120° F. (Comparative Examples 18 and 19).

We surprisingly found that ethylene glycol succinate, which has a limiting ester content equivalent to that of polylactic acid (each at about 61 wt. %), degrades more effectively in the cheesecloth test than the commercial polylactide when tested at 120° F. (see Examples 1 and 3). Degradation of the ethylene glycol succinate could be improved by using products having higher acid values (Examples 5, 6, and 8).

Additional improvements in degradability of the ethylene glycol succinates are achieved by acid-terminating the polyesters with phthalic anhydride (Examples 2 and 4).

Interestingly, a simple admixture of the ethylene glycol succinate with a half acid ester (HAE) produced by reacting phthalic anhydride with one molar equivalent of diethylene glycol improves degradability (compare Example 7 with Example 6).

Polyglycolic acid (PGA) is another known diverting agent. High-molecular-weight PGA materials made by ring-opening polymerization are relatively expensive. Low-molecular-weight PGA (e.g., 1000 g/mol or less) can be made conveniently and cost-effectively by dehydration of a 70% aqueous glycolic acid solution, and similar materials have been suggested previously for use as diverting agents. In our experiments, low-molecular-weight PGA degrades well at 120° F. (Comparative Examples 9 and 11). However, the degradability of low-molecular-weight PGA can be further enhanced by acid-terminating with phthalic anhydride (Examples 10 and 12) or by combining the PGA with a minor proportion (e.g., 5 wt. %) of the HAE material described above.

TABLE A

Polyester Properties

| Ex | | hydroxyl value (mg KOH/g) | acid value (mg KOH/g) | Number-avg. molecular weight (g/mol) |
|---|---|---|---|---|
| 1 | ES, 46 OH | 47.2 | 1.0 | 2330 |
| 2 | ES, 46 OH + PAn | 34.6 | 12 | 2410 |
| 3 | ES, 20 OH | 21.0 | 1.0 | 5110 |
| 4 | ES, 20 OH + PAn | 15.8 | 6.0 | 5170 |
| 5 | ES, 21 AV | 56.0 | 21 | 1460 |
| 6 | ES, 32 AV | 56.0 | 32 | 1280 |
| 7 | ES, 32 AV + 5% HAE | 53.2 | 41 | 1000 |
| 8 | ES, 52 AV | 56.0 | 52 | 1040 |
| C9 | PGA(1) | 103 | 103 | 545 |
| 10 | PGA(1) + PAn | 0 | 309 | 693 |
| C11 | PGA(2) | 47.6 | 47.6 | 1180 |
| 12 | PGA(2) + PAn | 41.5 | 54.9 | 1200 |
| 13 | PGA(2) + 5% HAE | 46.3 | 46.3 | 1130 |
| C14 | BIOVERT ® polylactide | – | – | – |
| C15 | RUCOTE ® XP 5500 | <5.0 | 75 | 1400 |
| C16 | RUCOTE ® 562 | 8.0 | 55 | 1780 |
| C17 | RUCOTE ® 9006 | 4.0 | 36 | 2810 |
| C18 | STEPANPOL ® PC-101P-56 | 56.3 | 0.12 | 1990 |
| C19 | STEPANPOL ® PC-102-56 | 58.0 | 0.33 | 1920 |

ES = ethylene glycol succinate;
PGA = polyglycolic acid;
PAn = phthalic anhydride reactant;
HAE = half ester of PAn and diethylene glycol additive at 5 wt. %.
OH = hydroxyl value in mg KOH/g;
AV = acid value in mg KOH/g.
BIOVERT ® polylactide diverting agent, product of Halliburton. RUCOTE ® acid-terminated polyesters and STEPANPOL ® polyester polyols are products of Stepan Company.

TABLE 1

Polyester Polyol Decomposition Results, Cheesecloth Test
(% mass loss versus time)

| | | 110° F. | | | 120° F. | | | 150° F. | | |
|---|---|---|---|---|---|---|---|---|---|---|
| Ex | | 4 days | 7 days | 14 days | 4 days | 7 days | 14 days | 4 days | 7 days | 14 days |
| 1 | ES, 46 OH | 7.4 | 8.6 | 9.2 | 7.0 | 8.2 | 8.8 | 11.4 | 12.4 | 19.8 |
| 2 | ES, 46 OH + PAn | 16.2 | 18.2 | 20.2 | 17.7 | 20.0 | 24.2 | 39.4 | 41.6 | 58.0 |
| 3 | ES, 20 OH | | | | 4.2 | 5.2 | 5.4 | | | |
| 4 | ES, 20 OH + PAn | | | | 9.2 | 9.8 | 11.4 | | | |
| 5 | ES, 21 AV | | | | 8.2 | 13.8 | 18.6 | | | |
| 6 | ES, 32 AV | | | | 7.4 | 17.7 | 22.7 | | | |

TABLE 1-continued

Polyester Polyol Decomposition Results, Cheesecloth Test
(% mass loss versus time)

| | | 110° F. | | | 120° F. | | | 150° F. | | |
|---|---|---|---|---|---|---|---|---|---|---|
| Ex | | 4 days | 7 days | 14 days | 4 days | 7 days | 14 days | 4 days | 7 days | 14 days |
| 7 | ES, 32 AV + 5% HAE | | | | 12.2 | 24.7 | 26.6 | | | |
| 8 | ES, 52 AV | | | | 7.6 | 28.1 | 39.5 | | | |
| C9 | PGA(1) | 24.7 | 33.3 | 37.5 | 33.4 | 39.8 | 43.4 | 37.0 | 61.2 | 77.3 |
| 10 | PGA(1) + PAn | 28.5 | 38.9 | 42.5 | 41.6 | 44.7 | 54.2 | 52.6 | 69.0 | 82.6 |
| C11 | PGA(2) | | | | 18.6 | 29.2 | 39.1 | | | |
| 12 | PGA(2) + PAn | | | | 23.4 | 37.7 | 50.5 | | | |
| 13 | PGA(2) + 5% HAE | | | | 34.1 | 40.5 | 51.1 | | | |
| C14 | BIOVERT ® polylactide | | | | 2.0 | 1.7 | — | 29.5 | 34.9 | 52.5 |
| C15 | RUCOTE ® XP 5500 | | | | | | | <1 | — | — |
| C16 | RUCOTE ® 562 | | | | | | | <1 | — | — |
| C17 | RUCOTE ® 9006 | | | | | | | <1 | — | — |
| C18 | STEPANPOL ® PC-101P-56 | | | | <1 | — | — | | | |
| C19 | STEPANPOL ® PC-102-56 | | | | <1 | — | — | | | |

ES = ethylene glycol succinate;
PGA = polyglycolic acid;
PAn = phthalic anhydride reactant;
HAE = half ester of PAn and diethylene glycol additive at 5 wt. %.
OH = hydroxyl value in mg KOH/g;
AV = acid value in mg KOH/g.
BIOVERT ® polylactide diverting agent, product of Halliburton.
RUCOTE ® acid-terminated polyesters and
STEPANPOL ® polyester polyols are products of Stepan Company.

The preceding examples are meant only as illustrations; the following claims define the inventive subject matter.

We claim:

1. A hydraulic fracturing method for recovering oil from a low-temperature subterranean oil formation, wherein low-temperature means an average temperature within the range of 80° F. to 180° F., the method comprising: (a) before, during, or after inducing hydraulic fracturing within the formation, introducing into the formation a particulate, degradable polyester diverting agent in an amount effective to improve oil production from the formation; (b) allowing the diverting agent to degrade; and (c) recovering oil from the formation;
   wherein the diverting agent has a melting point greater than the average temperature within the formation; and
   wherein the diverting agent is a mixture of polylactic acids or polyglycolic acids with a half acid ester, wherein half acid ester means a reaction product of an alcohol or a polyol with a cyclic anhydride or dicarboxylic acid.

2. The method of claim 1 wherein the diverting agent is a mixture of polyglycolic acid having a number-average molecular weight within the range of 400 to 5,000 g/mol and 1 to 15 wt. %, based on the amount of diverting agent, of a half acid ester.

3. The method of claim 2 wherein the half acid ester is a reaction product of phthalic anhydride and diethylene glycol.

4. The method of claim 1 wherein the formation has an average temperature within the range of 90° F. to 150° F.

5. The method of claim 1 wherein the formation has an average temperature within the range of 100° F. to 130° F.

6. The method of claim 1 wherein the diverting agent has a melting point at least 30 Fahrenheit degrees greater than the average temperature of the formation.

7. The method of claim 1 wherein the diverting agent can degrade within the formation at temperatures less than 150° F. to lose at least 10% of its mass within 14 days.

8. The method of claim 1 wherein the diverting agent can degrade within the formation at temperatures less than 130° F. to lose at least 20% of its mass within 14 days.

* * * * *